United States Patent Office 3,541,794
Patented Nov. 24, 1970

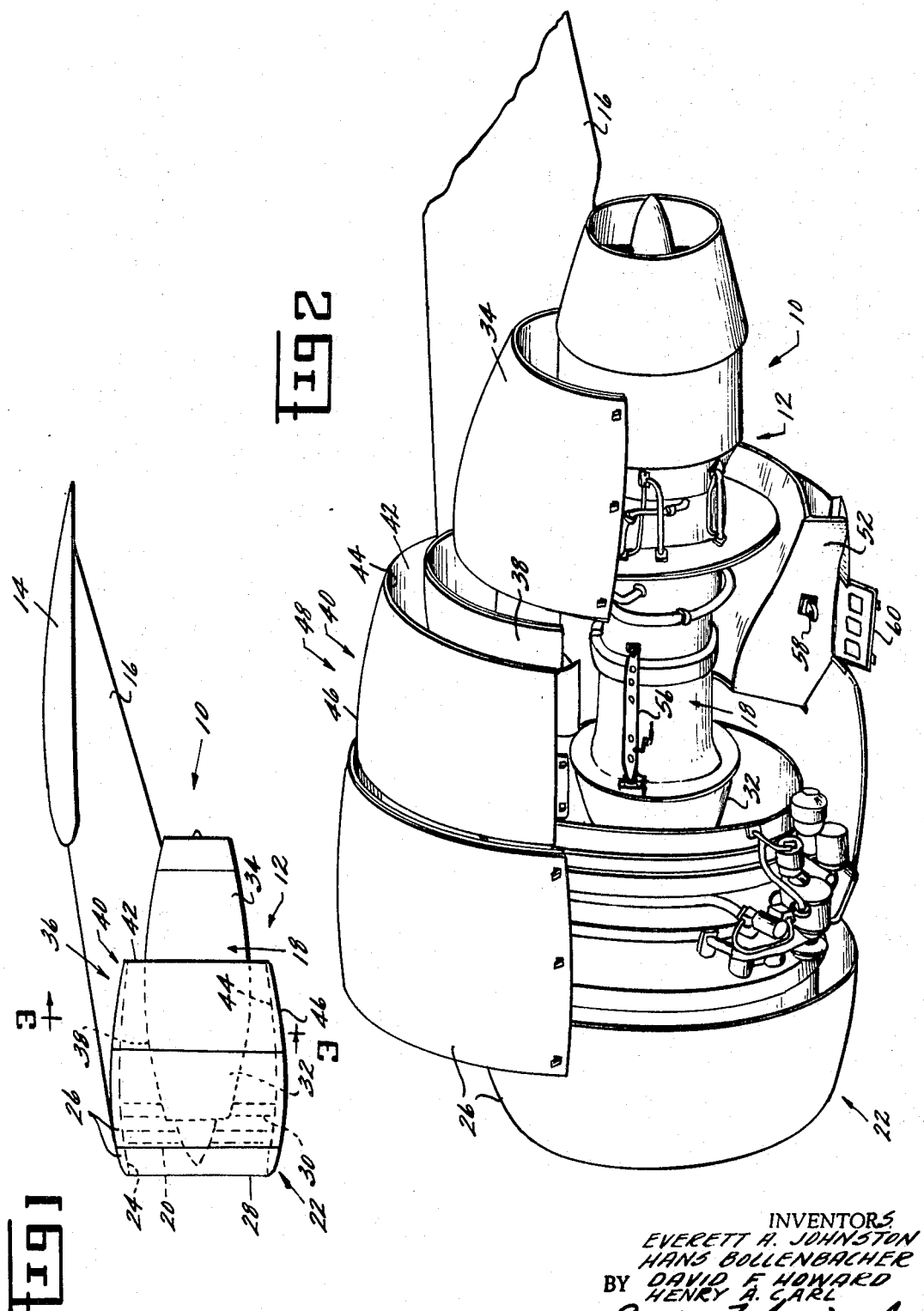

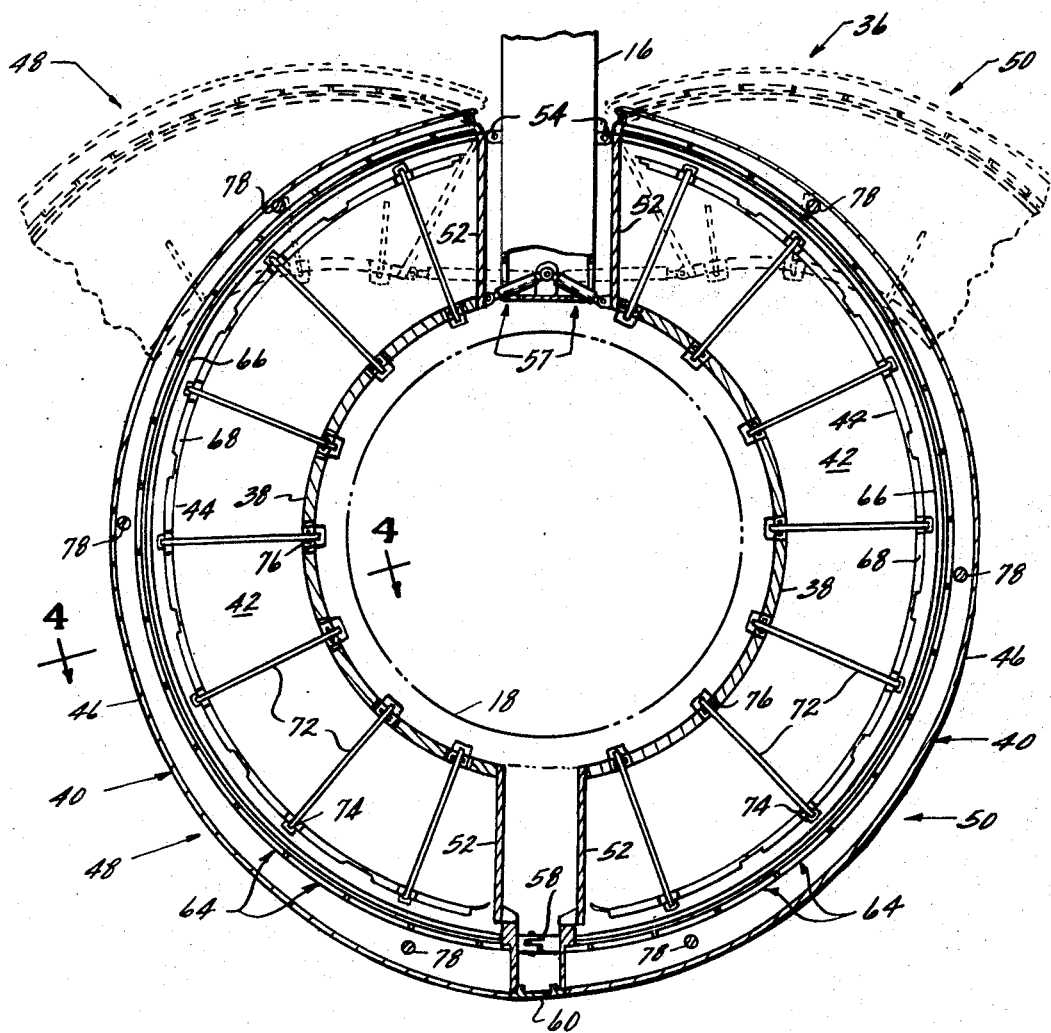

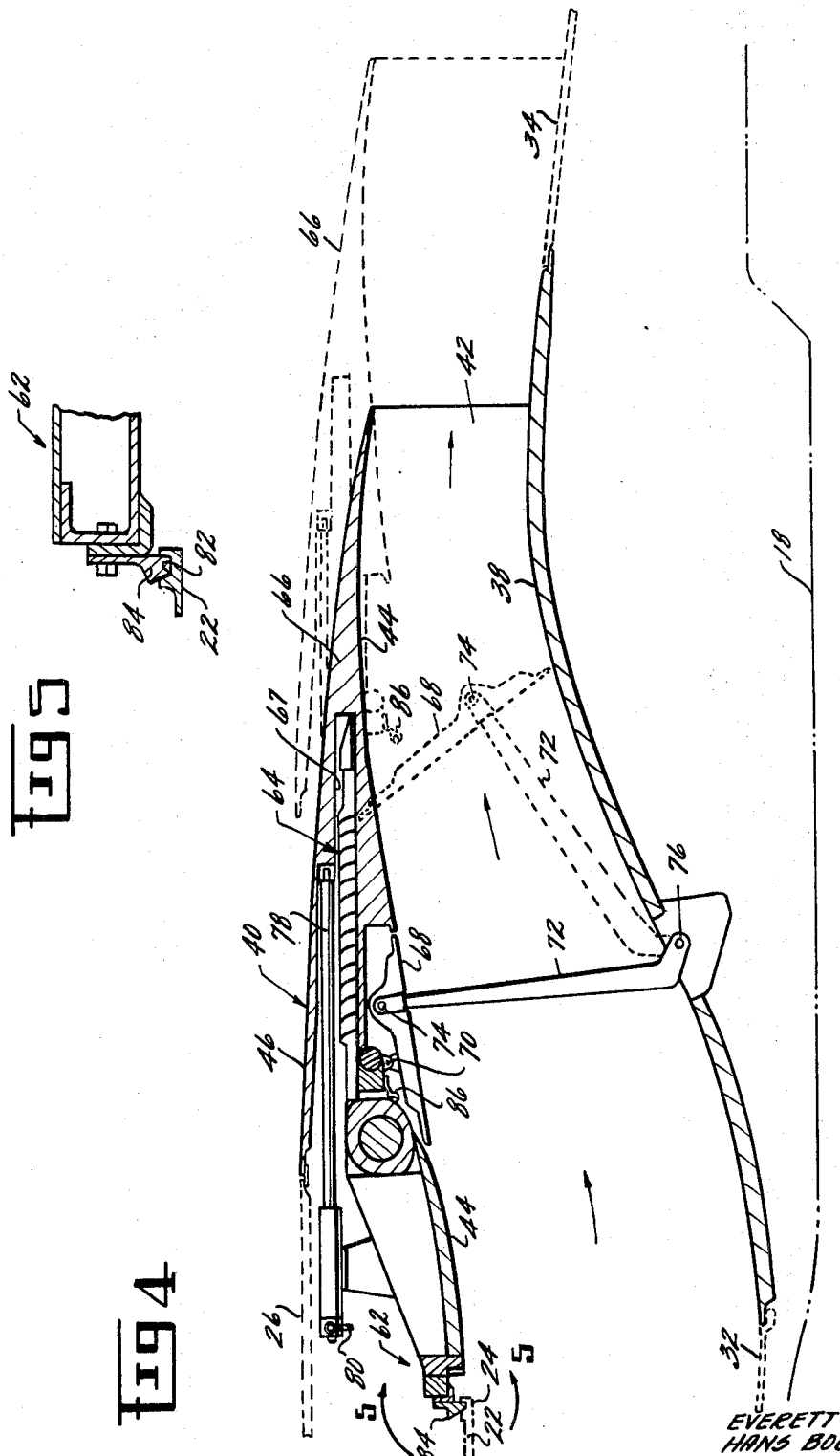

1

3,541,794
BIFURCATED FAN DUCT THRUST REVERSER
Everett A. Johnston, David F. Howard, and Hans Bollenbacher, Cincinnati, and Henry A. Carl, Sardinia, Ohio, assignors to General Electric Company, a corporation of New York
Filed Apr. 23, 1969, Ser. No. 818,717
Int. Cl. F02k 3/04, 1/20, 11/00
U.S. Cl. 60—226          7 Claims

ABSTRACT OF THE DISCLOSURE

Bifurcated thrust reversing means for use in an aircraft propulsion system and comprising a pair of duct assemblies hingeably connected to the aircraft supporting structure for rotation between an open position, enabling ready access to the core engine of the turbofan engine associated therewith, and a cruise position wherein the duct assemblies surround the core engine downstream of the fan duct and form an exhaust nozzle for receiving fan pressurized air from the fan duct and discharging said fan air to generate a forward propulsive thrust. The duct assemblies include means for blocking the fan flow and diverting such flow through flow reversing cascades carried by an outer wall assembly of said duct assemblies.

---

This invention relates to aircraft propulsion systems and, more particularly, to improved thrust reverser means for a turbofan engine.

With the advent of the turbofan engine, it has become necessary to supply a thrust reverser mechanism, which is of lightweight and straightforward construction, to reverse the fluid flow through the generally annular cross section of the fan bypass duct. Such suitable thrust reverser mechanisms are shown in U.S. Pats. No. 3,262,268, No. 3,262,270 and No. 3,262,271. Such reverser mechanisms, however, have usually been rigidly secured to the fan casing defining the fan bypass duct making access to the portion of the core gas turbine engine located radially inwardly of the thrust reverser mechanism, including accessory components mounted on the gas turbine engine, difficult and time consuming. Additionally, the removal or overhaul and repair schedule for the gas turbine engine associated with the thrust reverser may be, and usually is, different from that for the thrust reversing mechanism. However, since such prior thrust reversing mechanisms were constructed essentially integrally with the turbofan engine, separate removal of one or the other from its associated aircraft has heretofore been difficult, if not impossible, to achieve.

A primary object of this invention, therefore, is to provide thrust reversing means of the type shown in the above-referenced U.S. patents which permits ready access to the portion of the gas turbine engine disposed radially inwardly thereof.

A further object of this invention is to provide thrust reversing means for an aircraft propulsion system which enables ready access to the portion of the gas turbine engine disposed radially inwardly thereof and which permits independent removal of either the turbofan engine or the thrust reversing means from the aircraft.

Briefly, the above and other objects, which will become apparent upon reading the following description of the preferred embodiment, are achieved in the present invention by providing a pair of duct assemblies which are hingeably secured to a pylon or other aircraft-supporting structure for rotation between a cruise position, wherein the duct assemblies form an exhaust nozzle for receiving and discharging the fan airflow to provide forward thrust for the aircraft, and a position wherein access for overhaul and repair purposes is provided to the portion of the gas turbine engine disposed radially inwardly thereof. Each duct assembly includes an axially translatable portion which covers a plurality of flow reversing cascades in the cruise position. The translatable duct assembly portion is movable to a position wherein the flow reversing cascades are placed in flow communication with the fan flow through the exhaust nozzle. Means are provided to block the exhaust nozzle flow, downstream of the cascade assemblies, to divert the fan flow through the cascade assemblies and thereby produce reverse thrust. Each duct assembly includes an inner wall, which defines a streamline outer surface for the gas turbine engine, and an outer wall assembly spaced radially outwardly of the inner wall and defining the exhaust nozzle therebetween. The flow reversing cascade assemblies and the translatable portion of said duct assemblies are carried by the outer wall assemblies.

While the specification concludes with claims particularly pointing out and distinctly claiming the subject matter of this invention, it is believed the invention will be better understood upon reading the following description of the preferred embodiment in conjunction with the accompanying drawings wherein:

FIG. 1 is a side elevational view of an aircraft propulsion system embodying the present invention.

FIG. 2 is a perspective view of the aircraft propulsion system of FIG. 1, showing portions of the turbofan engine fairing members and the thrust reversing means of this invention rotated to an open position enabling access to the core or gas turbine engine and the accessories mounted on said engine and the fan casing structure;

FIG. 3 is a cross sectional view taken along lines 3—3 of FIG. 1 and drawn to an enlarged scale, said view showing the thrust reversing means of this invention in the cruise position of FIG. 1 and the rotated open position of FIG. 2;

FIG. 4 is a half cross sectional view taken along lines 4—4 of FIG. 3 and drawn to an enlarged scale; said view diagrammatically showing the thrust reversing means of this invention in the cruise position and the reverse thrust position; and FIG. 5 is an enlarged view of area 5—5 of FIG. 4.

With reference now to FIG. 1, an aircraft propulsion system has been shown generally at 10 as comprising a turbofan engine 12 secured to an aircraft or wing 14 by a pylon or other suitable aircraft support structure 16. The turbofan engine 12 has been shown as being of the well-known type including a core or centrally disposed gas turbine engine 18 which includes (not shown), in serial flow relationship, a compressor, a combustor, first turbine means for driving the compressor and second turbine means connected to a fan 20 disposed upstream of the core engine 18. The turbofan engine 12 also includes a fan casing structure 22 generally concentrically surrounding the fan 20 and an upsteam portion of the core engine 18. The fan casing 22 is formed with generally streamline inner and outer surfaces 24 and 26, respectively, and defines a generally annular fan duct 28 in which air is pressurized by the fan 20. The fan casing 22 and core engine 18 are secured to the aircraft support structure 16 by suitable well-known means (not shown) such as lugs, fasteners, or the like. Additionally, the fan casing 22 may be connected to the upstream end of the core engine 18 by suitable radial struts 30.

The core engine 18 may be provided with spaced upstream and downstream fairing members 32 and 34, respectively, for defining a streamline aerodynamic enclosure for portions of said engine.

The improved thrust reversing means of this invention has been shown generally at 36 in FIG. 1 as including an inner wall 38 and a radially outwardly spaced outer wall assembly 40 which cooperatively define an exhaust nozzle 42 therebetween which is adapted to receive the fan pressurized air from the fan duct 28 and discharge said fan flow to produce a forward propulsive thrust for the aircraft 14.

As best shown in FIGS. 1 and 4, the inner wall 38 is adapted to form a streamline enclosure for the core engine 18 between fairing members 32 and 34, and the outer wall assembly 40 is formed with an inner and outer surface 44 and 46, respectively, adapted to form a generally streamline continuation of the inner and outer surfaces 24 and 26 of the fan casing 22.

With reference now to FIGS. 2 and 3, the thrust reversing means of this invention has been shown as being of bifurcated construction and comprising a pair of substantially mirror image duct assemblies 48 and 50, each of which includes a generally arcuate outer wall assembly 40 and a radially inwardly spaced arcuate inner wall 38 suitably joined at their ends by radial wall members 52, as by welding, riveting or the like. Each duct assembly 48, 50 is rotatably secured to the pylon or aircraft support structure 16 through suitable hinge connections 54 for rotation, in a plane generally normal to the axis of the fan duct 28 and core engine 18, between a cruise position, wherein the duct assemblies extend around the core engine 18, as shown in FIGS. 1, 3 and 4, and an open position, as shown in FIGS. 2 and 3, wherein access is provided for the core engine 18 and accessories (shown generally at 56 in FIG. 2) attached thereto.

To facilitate rotation of the duct assemblies 48 and 50 between the cruise position and the open position, suitable actuator means of the fluid type, the motor-driven screw type, or the like may be provided as generally shown at 57 in FIG. 3.

As best shown in FIG. 3, the free ends of the duct assemblies 48, 50 are secured together in the cruise position by suitable latch means 58, which are preferably recessed within the outer wall closure 40 and covered by an access door 60, of well-known construction, which is hingeably carried by one of the duct assemblies.

Turning now to the thrust reversing mechanism of this invention, it should be understood that while a mechanism of the type described in detail in U.S. Pat. No. 3,262,271 has been shown generally in FIG. 4 and is the preferred construction, thrust reversing mechanisms of the type shown in U.S. Pats. No. 3,262,268 and No. 3,262,270 may also be employed. For a detailed description of such reverser mechanisms, reference is made to the above-cited U.S. patents.

Generally, however, as shown in FIG. 4, the outer wall assembly 40 of each duct assembly 48, 50 includes a fixed or nontranslatable portion 62 which is secured to radial walls 52, and hence to the inner wall 38, and forms a structurally rigid arcuate frame carrying one or more flow reversing cascades 64. Each outer wall assembly further includes a translatable portion 66 formed with an arcuate, axially extending groove or slot 67 adapted to receive and cover the cascades 64 when disposed in the cruise position. While the cascades 64 have been shown and have been and will hereinafter be described as being fixed and covered by the translatable portion 66, it should be understood that such arrangement may be reversed with the cascades being housed within the nontranslatable portion 62 in the cruise position and being movable with the translatable portion 66 out of said covered position.

The translatable portion 66 is slidably carried by the outer wall portion 62 for axial translation between the cruise position and a position spaced downstream thereof as shown by the broken lines in FIG. 4. As will be appreciated, when the outer wall assembly portion 66 is in its downstream position, the flow reversing cascades 64 are uncovered and placed in flow communication with the fan pressurized air within the duct assembly.

In order to block the flow of fan pressurized air through the exhaust nozble 42 and divert such flow through the exposed cascades 64, a plurality of peripherally disposed blocker flaps 68 are provided. Each flap is hingeably connected adjacent its upstream end, as at 70, to its respective outer wall assembly translatable portion 66 and is rotatable from its position of FIG. 4, wherein it forms a portion of the streamline inner surface 44, to the broken line blocking position of FIG. 4 by a radially disposed link 72 which is pivotably connected at its radial outer end 74 to its respective flap 68, and pivotably connected at its inner end 76 to the inner wall 38. Each duct assembly 48, 50 includes suitable actuator means 78 carried by the nontranslatable outer wall assembly portion 62 which are preferably of the ball screw type to translate the outer wall assembly portions 66 and rotate flaps 68 into the thrust reversing position. The actuators 78 for both duct assemblies 48 and 50 may be driven by a single flexible cable 80 which may be drivingly connected to suitable motor means (not shown) disposed within the aircraft support structure or pylon 16. While the actuation system has been shown and described as including ball screw type actuators which are drivingly connected by a flexible cable 80, it should be understood that other suitable actuators may be employed.

As previously mentioned, the latch means 58 are preferably recessed and disposed in radial alignment with the portion 62 of the outer wall assemblies so as to transmit hoop loads between the duct assemblies during reverse thrust operation with minimum bending moments.

Referring now to FIG. 5, the downstream end of the fan casing structure 22 has been shown formed with a radially opening peripheral groove 82 adapted to receive, in close fitting engagement, a radially inwardly extending flange 84 carried by each duct assembly so as to transmit axial loading on the duct assemblies to the aircraft support structure 16 through the fan casing structure 22. The radial flanges 84 are preferably secured to their respective outer wall assembly portions 62 by means which permit adjustment thereof so as to accommodate any tolerance stackup between the flange and its groove 82 and thereby ensure a proper fit therebetween.

To prevent leakage flow through the cascades during forward thrust operation, suitable seal means 86 is provided as in FIG. 4 to form a fluid seal between the translatable portion 66 and the nontranslatable portion 62 of each outer wall assembly 40.

While a preferred embodiment of the present invention has been depicted and described, it will be appreciated by those skilled in the art that many substitutions, modifications and variations may be made thereto without departing from the fundamental theme of this invention.

What is claimed is:

1. In an aircraft propulsion system of the type including a turbofan engine secured ot supporting aircraft structure, said turbofan engine including a hollow fan casing structure, a core engine of smaller diameter than said casing structure projecting into the downstream end of said casing structure and defining, in cooperation with said casing structure, an annular fan duct, a fan disposed in said fan duct, upstream of and drivingly connected to said core engine, for pressurizing air flow through said fan duct, the improvement comprising:

bifurcated thrust reversing means including a pair of duct assemblies hingeably secured to said supporting aircraft structure for rotation, on a plane generally normal to the axis of said gas turbine engine, between a cruise position, wherein said duct assemblies around said core engine, downstream of said casing structure, and form an exhaust nozzle for receiving and discharging said pressurized fan flow to provide forward thrust for said aircraft, and an open position wherein access for overhaul and repair purposes is provided to the portion of said core engine disposed radially inwardly of said duct assemblies, each said duct assembly including an outer wall assembly carrying at least one flow reversing cascade and means for blocking the discharge of fan pressurized air from said exhaust nozzle and diverting said flow through said flow reversing cascades to produce reverse htrust for said aircraft.

2. The improved structure of claim 1 further characterized in that said core turbine engine includes a first and second fairing member, said first fairing member disposed radially inwardly of the aft portion of said casing structure and defining a streamline outer surface for the upstream end of said core engine and an inner boundary for the aft portion of said bypass duct, said second fairing member being spaced downstream of said first fairing member and defining a streamline outer surface for an aft portion of said gas turbine engine, each said duct assembly having an inner wall spaced radially inwardly of its outer wall assembly for defining said exhaust nozzle therebetween, said inner wall adapted to define a streamline outer surface for said core engine, between said first and second fairings, when said thrust reversing means is in said cruise position.

3. The improved structure of claim 1 wherein said fan casing structure is formed with streamline inner and outer surfaces, said casing inner surface defining the outer boundary of said fan duct, said duct assemblies having an inner wall spaced radially inwardly of their respective outer wall assembly for defining said exhaust nozzle therebetween, said outer wall assembly having inner and outer surfaces adapted, respectively, to form a streamline continuation of said casing inner and outer surfaces when said thrust reversing means is disposed in said cruise position.

4. The improved structure of claim 1 wherein said fan casing structure is formed with a radially outwardly facing circumferential groove at its downstream end, the upstream end of each said duct assembly including a radially inwardly projecting arcuate flange member adapted for close fitting engagement with said groove when said duct axial loading from said thrust reversing means to said air-assemblies are in said cruise position so as to transmit craft support structure through said fan casing structure.

5. The improved structure of claim 1 wherein said duct assemblies include an inner wall spaced radially inwardly of their respective outer wall assembly for defining said exhaust nozzle therebetween, each said outer wall including a first portion and a second portion, said first portion rigidly secured at its ends to the ends of its associated inner wall by radial wall members and adapted to carry said flow reversing cascades, said second portion slideably carried by said first portion for axial translation between said cruise position, wherein said second portion covers said cascades, and a position spaced downstream of said cruise position wherein said cascades are uncovered and placed in flow communication with said fan pressurized air, actuator means carried by said first portion of said outer wall assemblies for translating said movable portion between said cruise position and said downstream position, a plurality of peripherally disposed blocker flaps pivotably carried by the movable portion of each said outer wall assembly, said blocker flaps forming a portion of the inner surface of said outer wall assemblies in said cruise position, link means pivotably connected to said flaps and said inner wall of said duct assemblies for guiding said flaps into blocking position across said exhaust nozzle, downstream of said cascades, when said movable outer wall portions are translated to said downstream position, whereby said fan pressurized air is diverted through said cascades to produce said reverse thrust.

6. The improved structure of claim 1 further characterized by and including actuator means for rotating said duct assemblies from said cruise position to said position enabling access to said gas turbine engine.

7. An aircraft propulsion system including, in combination:

a turbofan engine secured to supporting aircraft structure and including a centrally disposed gas turbine engine for generating a hot gas stream, strut means extending outwardly of said gas turbine engine adjacent its upstream end, a hollow casing structure carried by said strut means generally coaxially of said gas turbine engine and defining an annular fan bypass duct therethrough, a fan disposed in said casing structure and drivingly connected to said gas turbine engine for pressurizing air flow through said bypass duct; and bifurcated thrust reversing means, including a pair of duct assemblies hingeably secured to said supporting aircraft structure for rotation, in a plane generally normal to the axis of said gas turbine engine, between a cruise position, wherein said duct assemblies form an exhaust nozzle for receiving and discharging said pressurized fan flow to provide forward thrust for said propulsion system, and a position wherein access for overhaul and repair purposes is provided to the portion of said gas turbine engine disposed radially inwardly of said thrust vectoring means, each said duct assembly including a portion axially translatable from said cruise position to a spaced downstream position and means for blocking the flow of fan pressurized air through said exhaust nozzle and diverting said fan flow to produce a reverse thrust for said propulsion system when said translatable portion is in said downstream position.

References Cited

UNITED STATES PATENTS

| | | | |
|---|---|---|---|
| 2,623,713 | 12/1952 | Foster | 244—54 XR |
| 3,262,268 | 7/1966 | Beavers | 60—226 |
| 3,262,270 | 7/1966 | Beavers | 60—226 |
| 3,262,271 | 7/1966 | Beavers | 60—226 |

CARLTON R. CROYLE, Primary Examiner

U.S. Cl. X.R.

60—229, 39.31; 239—265.29, 265.31

PO-1050
(5/69)

UNITED STATES PATENT OFFICE
CERTIFICATE OF CORRECTION

Patent No. 3,541,794          Dated November 24, 1970

Inventor(s)        E. A. Johnston et al

It is certified that error appears in the above-identified patent and that said Letters Patent are hereby corrected as shown below:

Column 4, line 53, delete "ot" and insert --to-- in place thereof;

Column 4, line 66, after "assemblies" insert --extend--;

Column 5, line 4, delete "htrust" and insert --thrust-- in place thereof

Column 5, line 6, delete the word "turbine";

Column 5, line 24, after "fan duct," insert --each--;

Column 5, line 24, delete "assemblies having" and insert --assembly including-- in place thereof;

Column 5, line 25, delete "their respective" and insert --its-- in place thereof;

Column 5, transpose lines 38 and 39;

Column 5, line 41, after "wherein" insert --each--;

Column 5, line 42, delete "assemblies include" and insert --assembly includes-- in place thereof;

Column 5, line 43, delete "their respective" and insert --its-- in place thereof;

Column 5, line 44, after "wall" insert the word --assembly--; and

Column 6, line 39, delete "vectoring" and insert --reversing-- in place thereof.

Signed and sealed this 6th day of July 1971.

(SEAL)
Attest:

EDWARD M. FLETCHER, JR.          WILLIAM E. SCHUYLER, JR
Attesting Officer                    Commissioner of Patents